US008854991B1

(12) United States Patent
Breau et al.

(10) Patent No.: US 8,854,991 B1
(45) Date of Patent: Oct. 7, 2014

(54) TUNNELING BINDING MESSAGES IN REGISTRATION MESSAGES (75) Inventors: Jeremy R. Breau, Leawood, KS (US); Joseph Christopher Shojayi, Overland Park, KS (US); Frederick C. Rogers, Olathe, KS (US); Terry D. Nebergall, Gardner, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 920 days.

(21) Appl. No.: 12/392,774

(22) Filed: Feb. 25, 2009

(51) Int. Cl.
*H04L 12/26* (2006.01)
*H04L 12/28* (2006.01)

(52) U.S. Cl.
USPC .............................. 370/252; 370/254; 370/392

(58) Field of Classification Search
None
See application file for complete search history.

(56) References Cited

U.S. PATENT DOCUMENTS

2004/0148428 A1* 7/2004 Tsirtsis ..................... 709/238
2005/0099976 A1* 5/2005 Yamamoto et al. ........ 370/331
2009/0116452 A1* 5/2009 Guan ......................... 370/331

OTHER PUBLICATIONS

Brian E. Carpenter, Keith Moore, Bob Fink; Routing IPv6 Over IPv4; The Internet Protocol Journal—vol. 3, No. 1; Dec. 15, 2008; www.cisco.com/web/about/ac123/ac147/ac174/ac197/about_cisco_ipj_archive_article; pp. 1-9.
G. Tsirtsis, V. Park, Qualcomm, H. Soliman; Dual Stack Mobile IPv4 Draft-IETF-MIP4-DSMIPV4-08.TXT; Network Working Group Internet-Draft; Nov. 18, 2008; http://tools.ietf.org/html/draft-ietf-mip4-dsmipv4-08; pp. 1-25.

* cited by examiner

*Primary Examiner* — Ashley Shivers (57) ABSTRACT

A method, system, and medium are provided for updating bindings associated with a first mobile IP session by tunneling binding updates through registration messages associated with a second mobile IP session. A first mobile IP client provides binding updates to a second mobile IP client, which includes the binding updates in an extended registration request. The extended registration request is communicated to a mobile IP agent associated with the second mobile IP session. The request is parsed, and the binding updates are provided to a mobile IP agent associated with the first mobile IP session. Binding-update acknowledgements can be returned to mobile IP clients in a similar fashion.

21 Claims, 8 Drawing Sheets

TUNNELING BINDING MESSAGES IN REGISTRATION MESSAGES

SUMMARY

Embodiments of the invention are defined by the claims below, not this summary. A high-level overview of embodiments of the invention are provided here for that reason, to provide an overview of the disclosure.

In a first illustrative embodiment, a set of computer-useable instructions provides a method of performing a registration process corresponding to a first mobile internet protocol (IP) session associated with a first mobile IP client located on a wireless communications device. According to an embodiment of the invention, the method includes retrieving informational elements associated with the first mobile IP session from the first mobile IP client. An extended registration request corresponding to a second mobile IP session is generated and includes the informational elements associated with the first mobile IP session. The extended registration request can be provided to a mobility agent. In some embodiments, an extended registration reply is received and parsed to extract binding-update informational elements associated with the first mobile IP session and providing those elements to the first mobile IP client.

In a second illustrative embodiment, a set of computer-useable instructions provides a method of performing a registration process corresponding to a mobile internet protocol version 6 (IPv6) session associated with a first mobile IP client located on a wireless communications device. According to an embodiment of the invention, this exemplary method includes determining that a mobile IPv6 session is active and receiving binding updates from the mobile IPv6 client. Embodiments of the method include generating a registration request corresponding to a mobile IPv4 session and including the binding updates corresponding to the IPv6 session as extensions to the mobile IPv4 registration request. The extended registration request can be provided to a mobility agent, which can return an extended registration reply. The exemplary method further includes extracting IPv6 binding-update acknowledge informational elements from the extended registration reply and providing the elements to the mobile IPv6 client.

In another illustrative embodiment, a system is provided for performing a registration process corresponding to a first mobile internet protocol (IP) session associated with a first mobile IP client located on a wireless communications device. According to an embodiment of the invention, this exemplary system includes a first mobile IP agent associated with a first mobile IP session, a second mobile IP agent associated with a second mobile IP session, and an inter-agent interface adapted to facilitate communication between the first and second mobile IP agents.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments of the invention.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, random access memory (RAM), read-only memory (ROM), electrically erasable programmable read-only memory (EEPROM), flash memory or other memory technology, compact disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
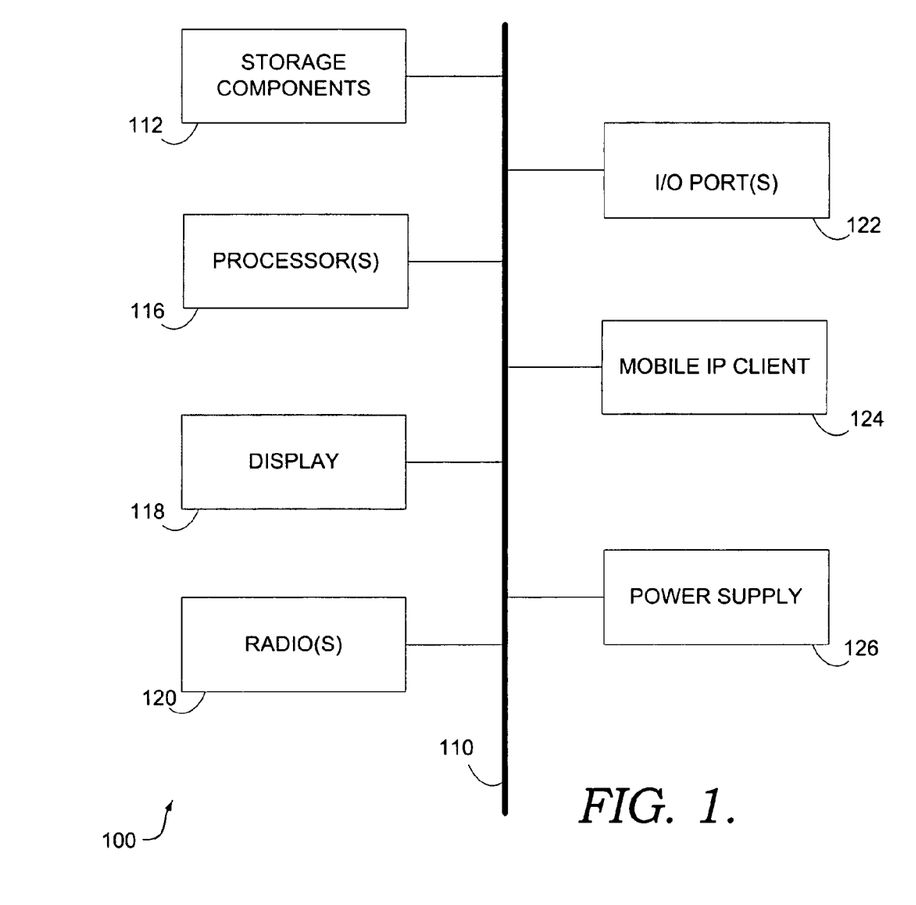
FIG. 1 is a block diagram showing an exemplary wireless communications device in accordance with embodiments of the invention.

An exemplary operating environment in which various embodiments of the invention may be implemented is described below in order to provide a general context for various embodiments of the invention. Referring initially to FIG. 1 in particular, an exemplary wireless operating environment for implementing embodiments of the invention is shown and designated generally as wireless communications device 100. Wireless device 100 is but one example of a suitable wireless computing environment and is not intended to suggest any limitation as to the scope of use or functionality of the invention. Neither should the wireless device 100 be interpreted as having any dependency or requirement relating to any one or combination of components illustrated. Wireless device 100 can include any number of suitable wireless communications devices such as, for example, cellular phones, personal data assistants (PDAs), and the like.

As shown, wireless device 100 includes a bus 110 that couples, directly or indirectly, the following illustrative components: a storage component 112, a processor 116, a display 118, a radio 120, input/output ports 122, a mobile internet protocol (IP) client 124, and a power supply 126.

Storage components 112 may take the form of the aforementioned computer-readable media. As with all of the illustrative components of FIG. 1, although we refer to them sometimes in the singular, that should not be read so as to imply that we mean only a single of each of the components is contemplated within the scope of our invention. To the contrary, by way of example, storage component or components 112 may actually be composed of constituent storage components located within wireless device 100.

Processors 116 facilitate a flow of information among all or a portion of the components shown in FIG. 1 as well as computer-usable instructions that help facilitate various embodiments of the invention. For example, in one embodiment, an operating system of mobile device 100 also helps coordinate various functional embodiments of the invention. Processors 116 operate in connection with running such an operating system.

Radios 120 facilitate the communication of wireless communication signals to and from wireless device 100. Illustrative protocols that can be utilized in connection with an embodiment of the invention include code division multiple access (CDMA), time division multiple access (TDMA), global system for mobile communications (GSM), general packet radio service (GPRS), evolution-data optimized (EV-DO), WiFi™, worldwide interoperability for microwave access (WiMax), and the like. The radios facilitate wireless communications between the device and a national or even global telecommunications network.

Input/output ports 122 provide a way for wireless device 100 to interact with other peripheral components. Illustrative input/output ports include an ear-piece or headphone jack, a USB port, an infrared port, and the like. Different input/output ports could be provided as is needed to facilitate communication of other peripheral components.

Mobile IP client 124 facilitates communications over a network using internet protocol (IP). In embodiments, mobile IP client 124 can include hardware, software, firmware and the like. Mobile IP client 124 generally will be adapted for using one or two particular versions of IP. For example, in an illustrative embodiment, mobile device 100 includes a first mobile IP client adapted to communicate using a version 4 of IP (IPv4) and a second mobile IP client adapted to communicate using a version 6 of IP (IPv6). Mobile IP client 124 can facilitate communications between wireless device 100 and other clients within wireless device 100 as well as to any number of various locations on a network. In some embodiments, the mobile IP client 124 communicates directly with other wireless devices or computing devices. In an embodiment, mobile IP client 124 interacts with a mobility agent such as, for example, a home agent (HA) or a foreign agent (FA) located on a network.

Power supply 126 may also take on a variety of forms ranging from a battery to a charging mechanism to other forms of power sources that serve to provide power to wireless device 100.

The selected components of wireless device 100 are meant to be illustrative in nature, and the various lower-level details of the components are not described so as to not obscure embodiments of the invention. Clearly, some of the components may be absent in some embodiments of the invention, and additional components not shown may also be part of wireless device 100. Attempting to show all of the various components of wireless device 100 would obscure certain novel aspects, and we refrain from such elaboration at least for the sake of brevity.

Figure 2:
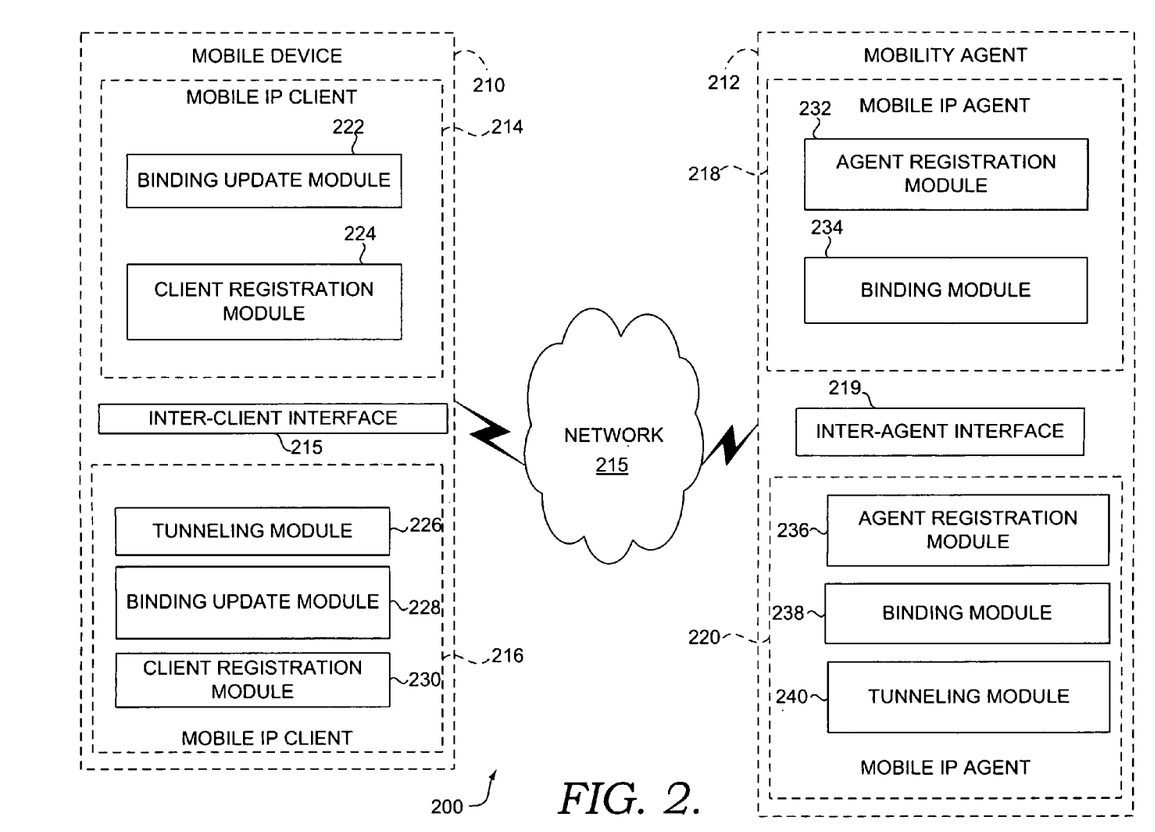
FIG. 2 is a block diagram showing an exemplary network environment suitable for implementing embodiments of the invention.

Turning now to FIG. 2, a block diagram is shown that illustrates an exemplary network environment 200 in accordance with an embodiment of the invention. Network environment 200 includes wireless device 210 and mobility agent 212. Although not shown in FIG. 2, network environment 200 also can include presence servers, accounting nodes, content servers, and the like. In embodiments, network environment 200 is a mobile network. Network environment 200 can be any of the various types of mobile networks known in the art and can support, for example, any of the protocols mentioned above with respect to FIG. 1. In other embodiments, Network environment 200 can be a local area network (LAN) or a wide area network (WAN) such as the Internet.

Network environment 200 is merely an example of one suitable network environment and is not intended to suggest any limitation as to the scope of use or functionality of embodiments of the invention. Neither should network environment 200 be interpreted as having any dependency or requirement related to any single component or combination of components illustrated therein. Similarly, although lines of communication are shown in FIG. 2, these connections are intended to be illustrative only and should not be read to limit the configuration of connections in various implementations of embodiments of the invention.

Each of these elements of the network environment 200 is also scalable. That is, for example, network environment 200 can include a large number of wireless devices 210. Additionally, for example, mobility agent 212 may actually include a number of mobility agents, operating in parallel with a load balancer such that large amounts of traffic may be managed. Of course, the same is true with any of the other elements of the exemplary network environment 200 and the components thereof such as, for example, first mobile internet protocol (IP) client 214, second mobile IP client 216, first mobile IP agent 218, second mobile IP agent 220, and any other network element or server that may be employed in an embodiment of the present invention. Any or all of these components may be implemented using any number of server modules, devices, machines, and the like.

In some embodiments, wireless device 210 includes one or more mobile IP clients 214 and 216. Mobile IP clients 214 and 216 can include software components, program modules, application programming interfaces (APIs), firmware, software, hardware components, and the like. Mobile IP clients 214 and 216 generally facilitate communications with other devices using any number of various versions of IP. For example, in one embodiment, mobile IP client 214 facilitates communication sessions using version 4 of mobile IP (IPv4) and mobile IP client 216 facilitates communication sessions using version 6 of mobile IP (IPv6). In other embodiments, both mobile IP clients 214 and 216 use IPv4, and in further embodiments, one and/or the other of mobile IP clients 214 and 216 can use any other type or version of internet protocol. It will be understood that IP sessions can include data sessions, voice sessions, video sessions, multimedia sessions, and any other type of communication that can be borne over IP.

With continued reference to FIG. 2, mobile IP client 214 includes a binding update module 222 and a client registration module 224. Binding update module 222 provides binding updates to mobility agent 212. Binding updates include informational elements that are used by a mobile IP agent 218, 220 to update bindings associated with wireless device 210. The informational elements can include identifiers corresponding to the wireless device 210, the user, and the like. The informational elements can also include addressing information such as, for example, IP addresses, port numbers, socket identifiers, and the like. In one embodiment, binding updates include a home address and a care-of-address. It will be readily appreciated that additional types of information can be included within a binding update. According to various embodiments, binding updates may include informational elements that are required for processing a registration request, and in embodiments, binding updates can include optional informational elements.

Client registration module 224 includes logic that manages client registrations from the perspective of the mobile IP client 214. For example, client registration module 224 can maintain bindings, information associated with any number of IP sessions, communicate with mobile IP agents, communicate with other mobile IP clients, and the like. In one embodiment, client registration module 224 communicates with a second mobile IP client 216 and provides informational elements for updating bindings associated with a mobile IP session corresponding to the second mobile IP client 216.

In this manner, registration processes corresponding to the mobile IP session associated with the first mobile IP client 214 can be performed by communicating the binding updates by way of a registration request sent by a second mobile IP client 216 to mobility agent 212. For example, in an embodiment, mobile IP client 214 corresponds to an IPv6 session and provides informational elements for updating bindings associated with the IPv6 session to mobile IP client 216. Mobile IP client 216 can then package the IPv6 binding updates inside, for example, an IPv4 registration message and communicate the message to mobility agent 212. Additionally, mobile IP client 216 can receive registration acknowledgement messages (e.g., replies, binding update acknowledgements, etc.) from mobility agent 212. The reply messages can include binding update acknowledgements associated with the IPv6 session, which mobile IP client 216 provides to client registration module of mobile IP client 214. As further illustrated in FIG. 2, mobile IP clients 214 and 216 can communicate with one another via an inter-client interface 215. Inter-client interface 215 can include various software modules, components, and the like. For example, in one embodiment, inter-client interface 215 is an API.

As shown in FIG. 2, mobile IP client 216 includes tunneling module 226, which cooperates with client registration module 224, binding update module 228 and mobile IP client 214 to tunnel binding updates through the IP sessions associated with mobile IP client 216. For example, tunneling module 226 can process informational elements received from mobile IP client 214 such that the informational elements can be included with a registration message associated with mobile IP client 216. In some embodiments, tunneling module 226 can construct registration messages, extensions for registration messages, header information for registration messages, payloads, and the like. In one embodiment, for example, tunneling module 226 and client registration module 224 cooperate to generate an extended registration message associated with mobile IP client 216 that includes binding update informational elements associated with mobile IP client 214 as extensions.

In some embodiments, tunneling module 226 parses registration reply messages associated with mobile IP client 216 to extract binding update acknowledgement information (e.g., registration replies) associated with mobile IP client 214. Tunneling module 226 can then provide the registrations reply associated with mobile IP client 214 to mobile IP client 214 and can forward the registration information associated with mobile IP client 214 to client registration module 230. Client registration module 230 can include logic necessary to generate registration requests, extended registration requests, and the like. It should be understood that mobile IP clients 214 and 216 can include any number of different components not illustrated in FIG. 2. Additionally, mobile IP clients 214 and 216 can include one or two modules that perform all of the functions described herein. In some embodiments, various processes can be divided amongst numerous modules or components.

As illustrated in FIG. 2, mobility agent 212 includes a first mobile IP agent 218, a second mobile IP agent 220, and an inter-agent interface 214, which facilitates communication between the two mobile IP agents 218 and 220. Any number of mobility agent 212 or mobile IP agents 218 and 220 can be a server, computing device, or other network component capable of providing services to wireless device 210. In an embodiment, for example, mobility agent 212 includes a foreign agent (FA) or a home agent (HA). In an embodiment, mobile IP agents 218 and 220 are each implemented on a separate machine. In other embodiments, mobile IP agents 218 and 220 are implemented on a single machine or a distributed processing system using several interconnected machines. In a further embodiment, combinations of the mobile IP agents 218 and 220 can be implemented on any number of machines and according to any number of various combinations.

The components of mobility agent 212 are also scalable. That is, in embodiments of the invention, there can be varying numbers of components. For instance, in one embodiment, mobility agent 212 includes one of each of mobile IP agent 218 and 220. In another embodiment, mobility agent 212 can include many of each of the components 218 and 220. Any number of configurations that operate to provide communications capabilities as described below can be suitable for implementing embodiments of the present invention.

In various embodiments, mobility agent 212 maintains mobility bindings associated with wireless device 210. A mobility binding generally includes a transparent binding of the home address of the wireless device 210 and with its care-of-address. For example, in an embodiment, mobility agent 212 is a home agent (e.g., in the home network of wireless device 210) and maintains mobility bindings for wireless device 210 in a mobility binding table. A mobility binding table can be a table, index, database, and the like, and includes the home address of wireless device 210, a care-of-address associated with wireless device 210, and an indication of the lifetime of the association between the two addresses. In other embodiments, mobility binding tables can include additional information such as media addresses, port addresses, time-stamps, cached content, metadata, and the like. Mobility bindings are used by mobility agent 212 as part of the process of registering wireless device 210, as will be appreciated by those that understand the art. There are many different types of registration processes that mobility agent 212 can perform, and any of these is considered to be within the ambit of the invention.

In one embodiment of the invention, mobile IP agent 218 is adapted to process mobile IPv4 registration requests received from a mobile client 214 and mobile IP agent 220 is adapted to process mobile IPv6 registration requests received from a mobile client 214. In other embodiments, mobile IP agents 218 and 220 can be adapted to process registration requests associated with any number of other versions, adaptations, and implementations of mobile IP. As depicted in FIG. 2, mobile IP agent 218 includes an agent registration module 232 and a binding module 234. According to various embodiments, agent registration module 232 utilizes binding module 234 to maintain current bindings associated with wireless device 210. In some embodiments, binding module 234 receives binding updates associated with mobile client 214.

Mobile IP agent 220 includes an agent registration module 236, a binding update module 238, and a tunneling module 240. Agent registration module 236 facilitates registration processes associated with mobile IP agent 220. For instance, in one embodiment, mobile IP agent 220 can receive registration requests from a mobile IP client 216. The registration requests can be parsed in a tunneling module 240 to extract binding updates and/or other information associated with a second IP session and mobile IP client 214. Tunneling module 240 can provide the binding updates to mobile IP agent 218 and binding updates associated with mobile IP agent 220 can be provided to binding update module 238. Binding update acknowledgement information can be provided by tunneling module 240 to mobile IP agent 218, where the information may be packaged with registration reply messages associated with mobile IP agent 220. The binding update acknowledgement information can be included in registration reply messages associated with mobile IP agent 220 as extensions, tails, and the like.

Turning now to FIGS. 3-6, a series of block diagrams is shown that illustrates an exemplary use scenario of embodiments of the invention. Wireless device 300 includes a mobile IP client 310 and mobile IP client 312. Mobile IP client 310 and mobile IP client 312 can communicate in various ways such as, for example, directly, or via an inter-client interface 315. For the sake of clarity with respect to the present discussion of FIGS. 3-6, the exemplary implementation shall be understood to be one in which mobile IP client 310 is associated with an IPv6 session and that mobile IP client 312 is associated with an IPv4 session. According to embodiments, either the IPv4 or IPv6 sessions may have been established before the other. Additionally, in some embodiments, the IPv4 and IPv6 sessions are independent, stand-alone sessions, and in other embodiments, the IPv4 and IPv6 sessions are interdependent but capable of being rendered independent without disrupting communications in either session significantly.

Figure 3:
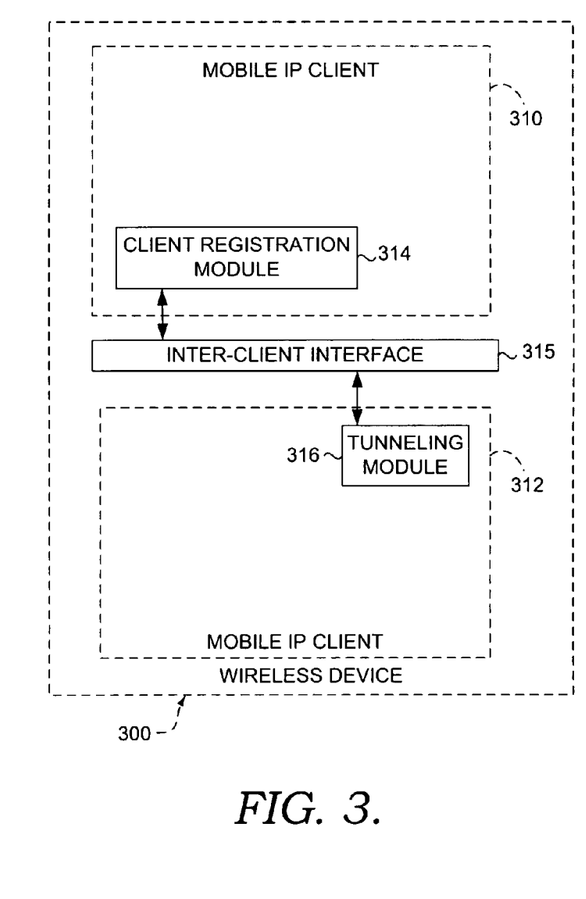
FIG. 3 is a block diagram illustrating an exemplary wireless device according to various implementations of some embodiments of the invention.

As shown in FIG. 3, mobile IP client 310 includes client registration module 314 that communicates with tunneling module 316 via inter-client interface 315. In an embodiment, tunneling module 316 determines whether there is an active IP session associated with mobile IP client 310. In some embodiments, this determination is made by querying client registration module 314. In other embodiments, tunneling module 316 receives information pushed from client registration module 314.

Figure 4:
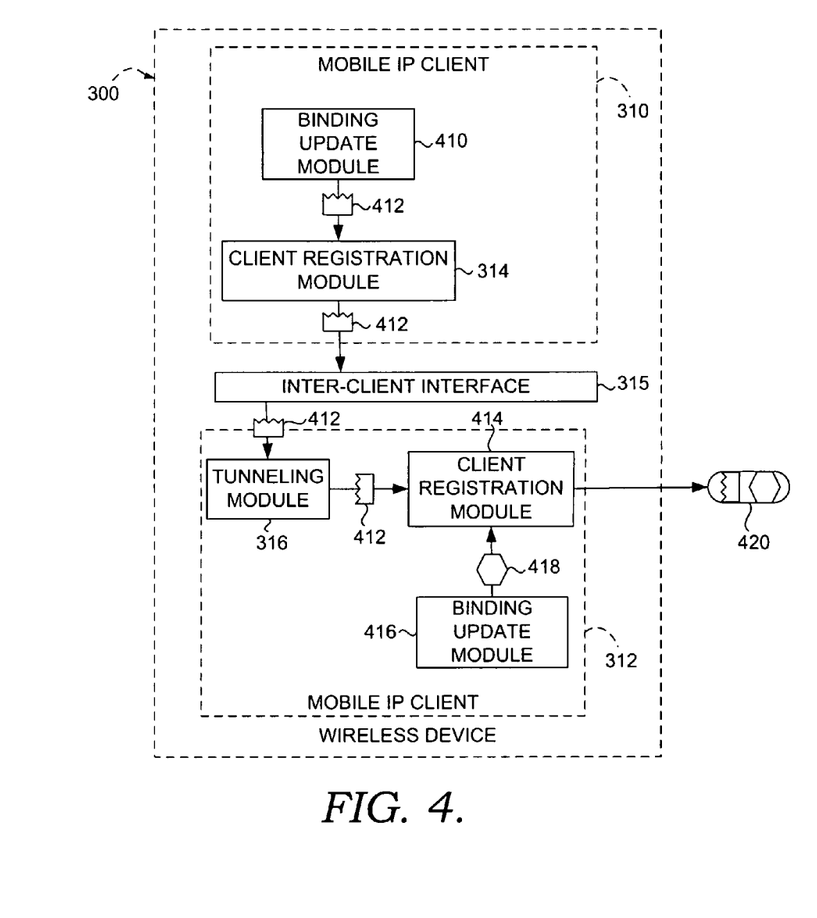
FIG. 4 is a block diagram illustrating additional components of the exemplary wireless device depicted in FIG. 3, according to various implementations of some embodiments of the invention.

With reference to FIG. 4, client registration module 314 receives binding updates (e.g., informational elements) 412 from binding update module 410. In embodiments, client registration module 314 provides the binding updates 412 to mobile IP client 312 via inter-client interface 315. For example, as shown in FIG. 4, client registration module 314 communicates, via inter-client interface 315, binding updates 412 to tunneling module 316.

As further illustrated in FIG. 4, client registration module 414 receives binding updates 418 and/or other registration information associated with mobile IP client 312 from binding update module 416. Client registration module 414 also receives binding update informational elements 412 associated with mobile IP client 310 from tunneling module 316. In an embodiment, client registration module 414 generates an extended registration message 420. Registration message 420 can include a data packet or a number of data packets. In embodiments, registration message 420 includes binding updates 418 associated with mobile IP client 312. As depicted in FIG. 4, registration message 420 can also include binding updates 412 associated with mobile IP client 310 as extensions, addendums, headers, tails, and the like. Once an extended registration message 420 is generated, it can be communicated to a mobility agent (not illustrated) for performing registration processes.

Figure 5:
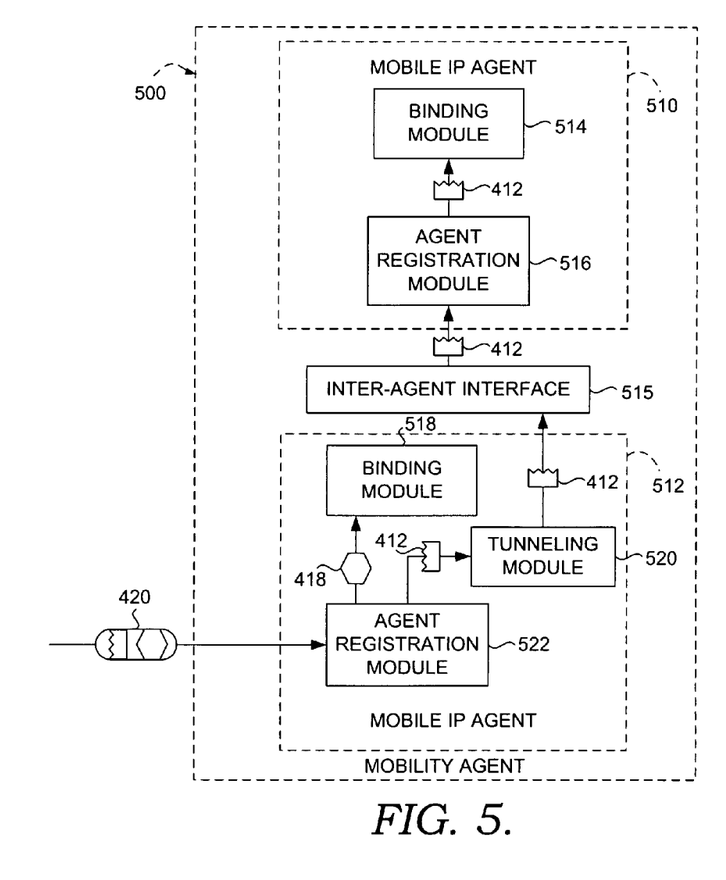
FIG. 5 is a block diagram illustrating an exemplary mobility agent according to various implementations of some embodiments of the invention.

Turning to FIG. 5, a block diagram illustrates an exemplary mobility agent 500 in accordance with various embodiments of the invention. As illustrated, mobility agent 500 includes a first mobile IP agent 510 and a second mobile IP agent 512 that communicate with one another via inter-agent interface 515. Mobile IP agent 510 includes a binding update module 514 and an agent registration module 516. As further illustrated in FIG. 5, mobile IP agent 512 includes a binding update module 518, an agent registration module 522, and a tunneling module 520.

According to an exemplary implementation of an embodiment of the invention, agent registration module 522 receives an extended registration request message 420 and parses the message 420 to extract binding updates 412 and provide the binding updates 412 to tunneling module 520. Tunneling module 520 provides the extracted binding updates 412 to agent registration module 516, via inter-agent interface 515. Agent registration module 522 also extracts binding updates 418 and provides the binding updates 418 to binding module 518 for updating bindings associated with an IP session corresponding to mobile IP agent 512.

Figure 6:
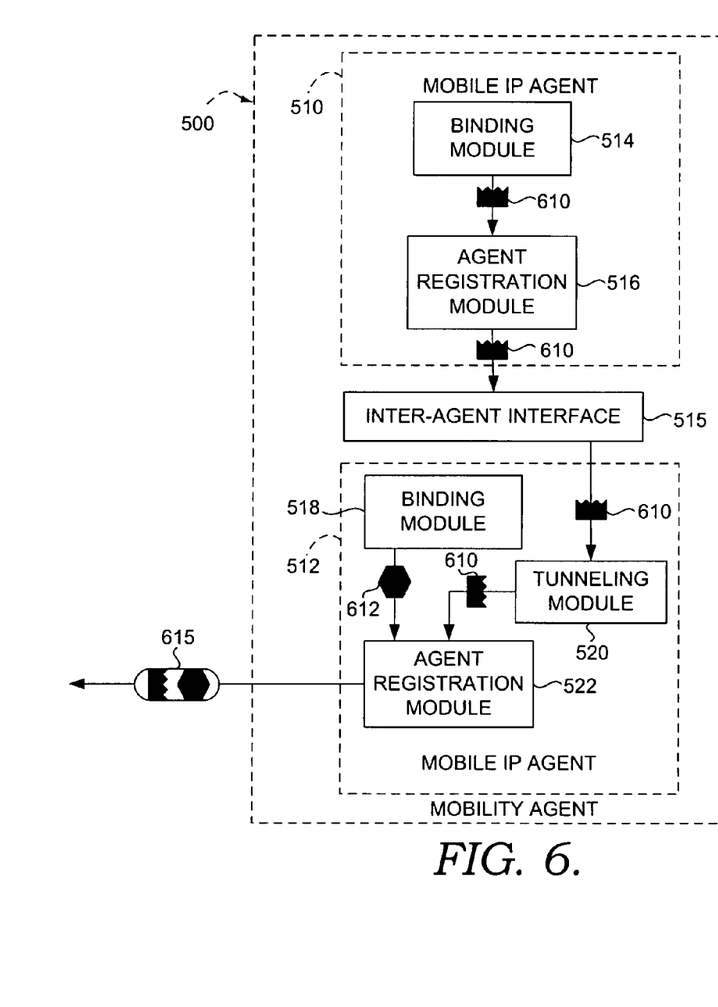
FIG. 6 is a block diagram illustrating additional components of the exemplary mobility agent depicted in FIG. 5, according to various implementations of some embodiments of the invention.

Turning briefly to FIG. 6, another block diagram is shown that depicts an exemplary mobility agent 500 in accordance with various implementations of an embodiment of the invention. As shown in FIG. 6, binding update module 514 generates a registration reply 610, which can contain any number of various types of information. For example, registration reply 610 can include binding update acknowledgement informational elements or indicators. As further depicted in FIG. 6, agent registration module 516 provides the registration reply 610 to tunneling module 520 associated with mobile IP agent 512. Agent registration module 522 receives the registration reply 610 from tunneling module 520 as well as a registration reply 612 associated with mobile IP agent 512 from binding module 518. Agent registration module 522 includes the registration reply 612 in a registration reply message 615. Registration reply message 615 also includes the registration reply 610 and can further include various headers, extensions, tails, and the like. In some embodiments, registration reply 610 can be included as an extension to registration reply message 615. In other embodiments, registration reply 610 can be included in a header associated with registration reply message 615.

Figure 7:
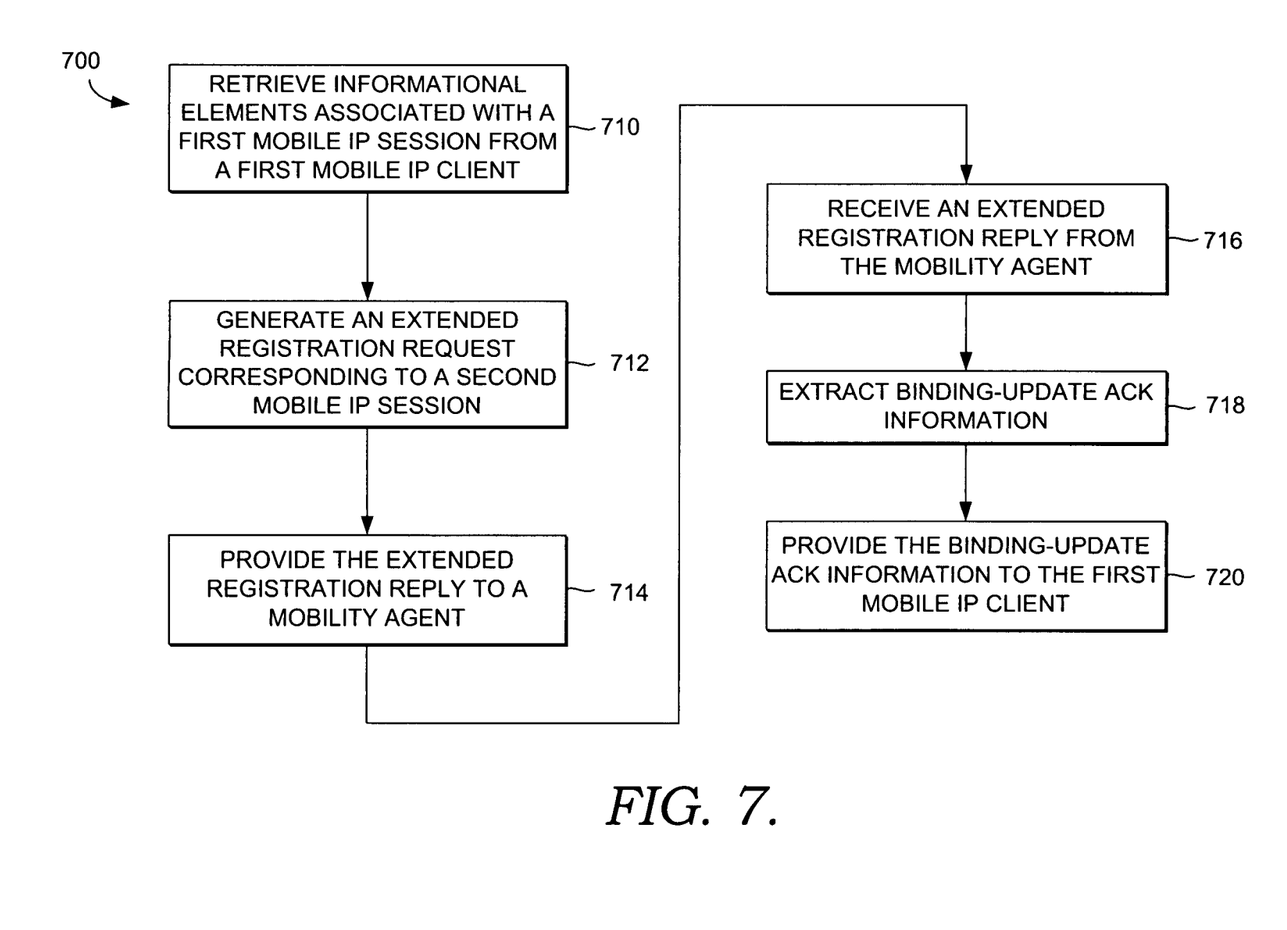
FIG. 7 is a flow diagram illustrating an exemplary method for performing a registration process corresponding to a first mobile internet protocol (IP) session associated with a first mobile IP client located on a wireless communications device, in accordance with embodiments of the invention.

To recapitulate, we have described systems and methods for performing a registration process corresponding to a first mobile internet protocol (IP) session associated with a first mobile IP client located on a wireless communications device. Turning now to FIG. 7, a flow diagram is shown that illustrates an exemplary method 700 of performing a registration process corresponding to a first mobile internet protocol (IP) session associated with a first mobile IP client located on a wireless device. At a first illustrative step 710, a second mobile IP client retrieves informational elements associated with a first mobile IP session from the first mobile IP client. In some embodiments, the informational elements can be binding updates, identifiers, and the like. At step 712, the second mobile IP client generates an extended registration request message. The extended registration request message includes a registration request message associated with the second mobile IP session and the binding updates corresponding to the first mobile IP session. In various embodiments, the binding updates corresponding to the first mobile IP session can be included in the message as extensions.

At step 714, the second mobile IP client provides the extended registration reply message to a mobility agent. Accordingly, as illustrated at step 716, the second mobile IP client receives an extended registration reply from the mobility agent. The extended registration reply message includes binding update acknowledgement information or indicators associated with each of the two mobile IP clients. Thus, as shown at step 718, the second mobile IP client parses the extended registration reply message to extract the binding update acknowledgments corresponding to the first mobile IP client. As shown in a final illustrative step 720, the extracted binding update acknowledgments are provided to the first mobile IP client.

Figure 8:
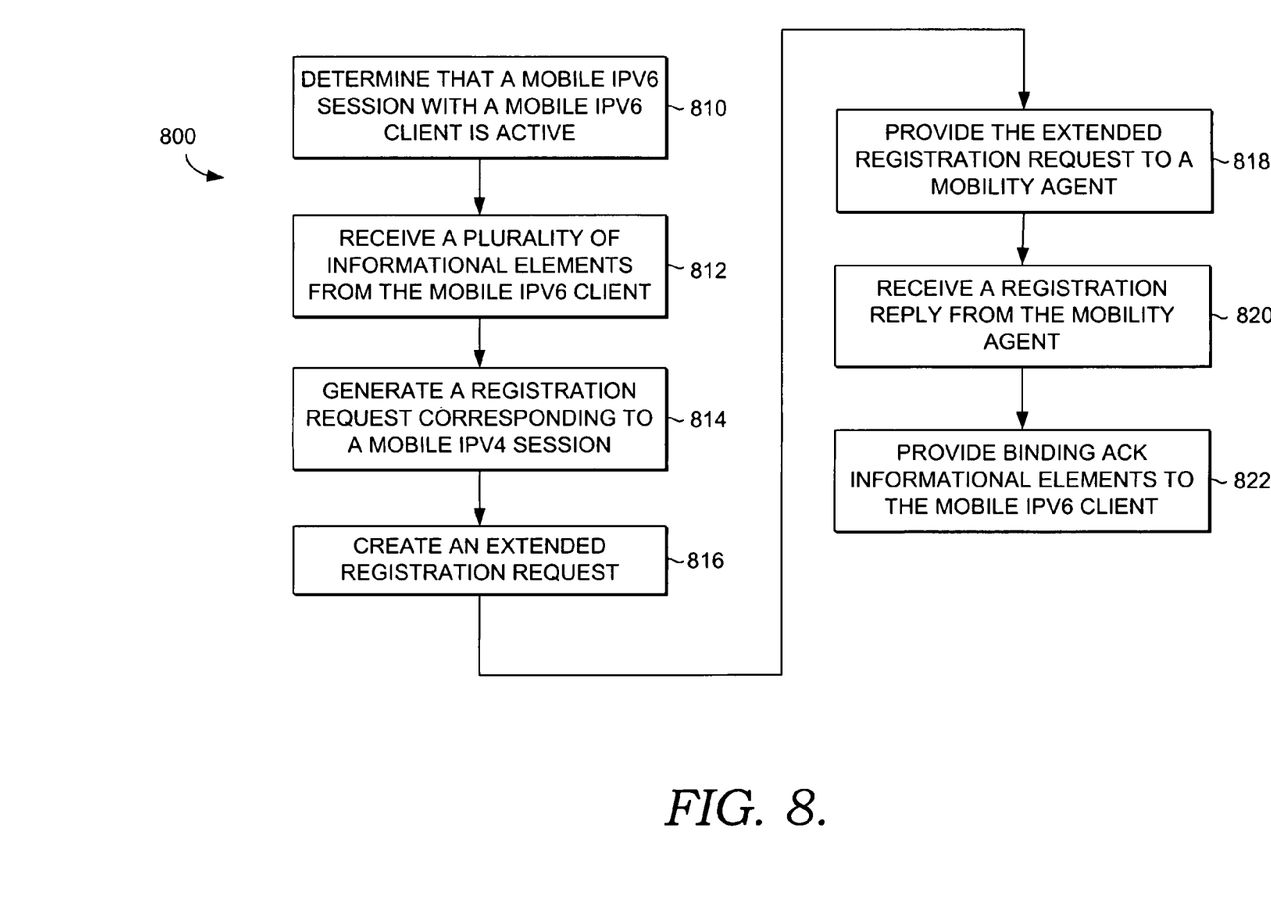
FIG. 8 is a flow diagram illustrating an exemplary method for performing a method for performing a registration process corresponding to a mobile internet protocol version 6 (IPv6) session associated with a first mobile IP client located on a wireless communications device, in accordance with embodiments of the invention.

Referring to FIG. 8, a flow diagram is shown that illustrates an exemplary method for performing a registration process corresponding to a mobile internet protocol version 6 (IPv6) session associated with a first mobile IP client located on a wireless device. At a first illustrative step 810, a mobile internet protocol version 4 (IPv4) client determines that a mobile IPv6 session with the mobile IPv6 client is active. In some embodiments, this determination includes first determining that the IPv6 session exists. In other embodiments, illustrative step 810 is not included.

As shown at step 812, the mobile IPv4 client receives a plurality of informational elements (e.g., binding updates) from the mobile IPv6 client. Additionally, the mobile IPv4 client generates or identifies binding updates corresponding to an IPv4 session. At step 814, the mobile IPv4 client generates a registration request message corresponding to the IPv4 session. As illustrated at step 816, the mobile IPv4 client can generate an extended registration request by including the binding updates for the IPv6 session in the registration request message, for example, as extensions. The mobile IPv4 client can provide the extended registration request to a mobility agent, as shown at step 818.

At step 820, the mobile IPv4 client receives a registration reply message from the mobility agent. In embodiments, the mobile IPv4 client parses the registration reply message to extract a registration reply message, binding update acknowledgement information, and the like associated with the IPv6 session. Binding update acknowledgement informational elements can be provided to the mobile IPv6 client to complete the registration process with respect to the IPv6 session.

Many different arrangements of the various components depicted, as well as components not shown, are possible without departing from the spirit and scope of the invention. Embodiments of the invention have been described with the intent to be illustrative rather than restrictive. It will be understood that certain features and subcombinations are of utility and may be employed without reference to other features and subcombinations and are contemplated within the scope of the claims. Further, not all steps listed in the various figures need be carried out in the specific order described, unless specifically prescribed.

For example, embodiments of the invention provide for performing registration processes associated with two different IP sessions that are wholly independent of one another by tunneling binding updates corresponding to a first mobile IP session through registration request messages corresponding to a second mobile IP session. In embodiments, either one of the mobile IP sessions could be discontinued such as, for example, by performing a deregistering process corresponding to one of the mobile IP clients, without affecting the other mobile IP session.

In other embodiments of the invention, any number of mobile IP clients can be included on a wireless device, and in some embodiments, a single IP client can be included on a wireless device. In various embodiments, a mobile IP client can be adapted to facilitate communication sessions using a number of different versions or types of IP. According to embodiments, for example, a mobile IP client can facilitate video communications, interactive games, global positioning system (GPS) applications, and the like. In further embodiments, mobility agents can be implemented in any number of ways to achieve efficiencies.

According to still further embodiments of the invention, binding updates and other related information associated with one mobile IP client can be opaque to another mobile IP client. In some embodiments, a first mobile IP client provides binding updates to a second mobile IP client, but the second mobile IP client need only be able to determine attributes associated with that data in order to tunnel the data through registration messages. Similarly, a first mobile IP agent may be able to identify, parse, and extract information associated with a second mobile IP agent from an extended registration request message, but in some instances, may not be able to process or "understand" the information. It should be understood that various levels of opacity can be employed in various implementations.

The invention claimed is:

1. One or more non-transitory computer-readable media having computer-executable instructions embodied thereon for performing a method for performing a registration process corresponding to a first mobile internet protocol (IP) session associated with a first mobile IP client located on a wireless communications device having both a first mobile IP client and a second mobile IP client, the method comprising:

retrieving informational elements associated with the first mobile IP session from the first mobile IP client, wherein the first mobile IP session is an IP version six session;

generating an extended registration request corresponding to a second mobile IP session associated with the second mobile IP client, wherein the second mobile IP session is configured as an IP version four session and the extended registration request is a registration request for the second mobile IP session generated by a tunneling module of the wireless device and the request comprises an extension that includes said informational elements of the first mobile IP session;

providing the extended registration request to a mobility agent, the request includes the informational elements that correspond to the binding updates for the first mobile IP session;

receiving an extended registration reply comprising an extension that includes binding-update acknowledgement information corresponding to the first mobile IP session; and providing the binding-update acknowledgement information to the first mobile IP client, wherein the second mobile IP client provides the binding-update acknowledgement information to the first mobile IP client via an inter-client interface of the wireless communications device.

2. The media of claim 1, further comprising determining that the first mobile IP session exists.

3. The media of claim 2, further comprising determining that the first mobile IP session is active.

4. The media of claim 3, wherein said informational elements comprise a home address and a care-of address.

5. The media of claim 1, wherein the informational elements are opaque to a second mobile IP client.

6. The media of claim 1, further comprising parsing the extended registration reply to extract the binding-update acknowledgement information associated with the first mobile IP session.

7. The media of claim 1, further comprising discontinuing the second mobile IP session, wherein the first mobile IP session is unaffected by said discontinuing.

8. The media of claim 7, wherein said discontinuing comprises performing a deregistering process associated with the second mobile IP client.

9. The media of claim 1, wherein the first mobile IP session and the second mobile IP session are independent of each other.

10. The media of claim 1, wherein the second mobile IP client receives the extended registration reply and extracts the binding-update acknowledgement information corresponding to the first mobile IP session.

11. One or more non-transitory computer-readable media having computer-executable instructions embodied thereon for performing a method for performing a registration process corresponding to a mobile internet protocol version 6 (IPv6) session associated with a first mobile IP client located on a wireless communications device having both the first mobile IP client and a second mobile IP client, the method comprising:

determining that the mobile IPv6 session exists;
determining that a mobile IPv6 session is active;
receiving a plurality of binding-update informational elements from the first mobile IP client, wherein the plurality of binding-update informational elements comprises at least one informational element that can be provided to a mobile IP agent for updating bindings associated with the mobile IPv6 session;

generating a registration request corresponding to a mobile IPv4 session associated with the second mobile IP client;

including the plurality of binding-update informational elements as an extension to the registration request to create an extended registration request from the registration request of the mobile IPv4 session associated with the second mobile IP client;

providing the extended registration request to a first mobile IP agent associated with the mobile IPv4 session and located at a mobility agent, wherein the mobility agent also includes a second mobile IP agent, the second mobile IP agent being associated with the mobile IPv6 session;

receiving a registration reply from the mobility agent, wherein the registration reply comprises one or more binding-acknowledge informational elements associated with the mobile IPv6 session; and providing the one or more binding-acknowledge informational elements associated with the mobile IPv6 session to the first mobile IP client, wherein the second mobile IP client provides the binding-update acknowledgement information to the first mobile IP client via an inter-client interface of the wireless communications device.

12. The media of claim 11, wherein said binding-update informational elements comprise a home address and a care-of address.

13. The media of claim 11, wherein said binding-update informational elements are opaque to the second mobile IP agent.

14. A computer system for performing a registration process, the system having a wireless communication device, comprising:

a first mobile IP client executing a registration process corresponding to a first mobile internet protocol (IP) session associated with the first mobile IP client located on a wireless communications device and the first mobile IP session is an IP version six session;

a second mobile IP client to perform the following:
retrieve informational elements associated with the first mobile IP session from the first mobile IP client;
generate an extended registration request corresponding to a second mobile IP session associated with the second mobile IP client, wherein the second mobile IP session is configured as an IP version four session and the extended registration request is a registration request for the second mobile IP session generated by a tunneling module of the wireless device and the request comprises an extension that includes said informational elements of the first mobile IP session;
provide the extended registration request to a mobility agent, the request includes the informational elements that correspond to the binding updates for the first mobile IP session;
receive an extended registration reply comprising an extension that includes binding-update acknowledgement information corresponding to the first mobile IP session; and
provide the binding-update acknowledgement information to the first mobile IP client, wherein the second mobile IP client provides the binding-update acknowledgement information to the first mobile IP client via an inter-client interface of the wireless communication device.

15. The computer system of claim 14, further comprising determining that the first mobile IP session exists.

16. The computer system of claims 15, further comprising determining that the first mobile IP session is active.

17. The computer system of claim 16, wherein said informational elements comprise a home address and a care-of address.

18. The computer system of claim 14, wherein the informational elements are opaque to a second mobile IP client.

19. The computer system of claim 14, further comprising parsing the extended registration reply to extract the binding-update acknowledgement information associated with the first mobile IP session.

20. The computer system of claim 14, further comprising discontinuing the second mobile IP session, wherein the first mobile IP session is unaffected by said discontinuing.

21. The computer system of claim 20, wherein said discontinuing comprises performing a deregistering process associated with the second mobile IP client.

\* \* \* \* \*